(12) United States Patent
Aoi (10) Patent No.: US 9,709,454 B2
(45) Date of Patent: Jul. 18, 2017

(54) NON-RESONANT KNOCK SENSOR (71) Applicant: NGK SPARK PLUG CO., LTD., Nagoya-shi, Aichi (JP)

(72) Inventor: Katsuki Aoi, Kani (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 252 days.

(21) Appl. No.: 14/415,336

(22) PCT Filed: Oct. 24, 2013

(86) PCT No.: PCT/JP2013/078822
§ 371 (c)(1),
(2) Date: Jan. 16, 2015

(87) PCT Pub. No.: WO2014/097737
PCT Pub. Date: Jun. 26, 2014

(65) Prior Publication Data
US 2015/0204750 A1 Jul. 23, 2015

(30) Foreign Application Priority Data
Dec. 19, 2012 (JP) ................................. 2012-276513

(51) Int. Cl.
*G01L 23/22* (2006.01)
(52) U.S. Cl.
CPC ................... *G01L 23/222* (2013.01)
(58) Field of Classification Search
CPC .............................. F02D 35/027; G01L 23/221
(Continued)

(56) References Cited

U.S. PATENT DOCUMENTS 6,786,078 B2   9/2004  Brammer
7,004,009 B2   2/2006  Yokoi et al.
(Continued)

FOREIGN PATENT DOCUMENTS

JP    61-153530 A     7/1986
JP    2003-517597 A   5/2003
(Continued)

OTHER PUBLICATIONS

International Search Report for PCT/JP2013/078822 dated Jan. 7, 2014.
(Continued)

*Primary Examiner* — Paul West
*Assistant Examiner* — Mark A Shabman
(74) *Attorney, Agent, or Firm* — Sughrue Mion, PLLC (57) ABSTRACT A non-resonant knock sensor includes: a sensor body having a metal shell provided with a shell-side cylindrical portion and a shell-side flange portion, a piezoelectric element, a weight arranged to hold the piezoelectric element between the shell-side flange portion and the weight and a fixing member having a third through hole through which the shell-side cylindrical portion is inserted and being arranged to press the weight toward the shell-side flange portion and thereby fix the weight in position; and a resin molded part. The fixing member has formed therein flow paths for introducing a resin into an inner space between the shell-side cylindrical portion and the piezoelectric element. The flow paths are provided in the form of at least one of being connected to the third through hole and being separated from the third through hole and are formed intermittently in a circumferential direction of the fixing member.

4 Claims, 7 Drawing Sheets (58) Field of Classification Search
USPC .......................................................... 73/1.82
See application file for complete search history.

(56) References Cited

U.S. PATENT DOCUMENTS

| | | | |
|---|---|---|---|
| 7,201,038 | B2 | 4/2007 | Kohashi et al. |
| 2003/0154957 | A1* | 8/2003 | Subramanian ........ G01L 23/222 123/406.4 |
| 2004/0011135 | A1 | 1/2004 | Brammer |
| 2005/0262925 | A1* | 12/2005 | Yokoi .................. G01L 23/222 73/35.12 |
| 2006/0081034 | A1 | 4/2006 | Kohashi et al. |

FOREIGN PATENT DOCUMENTS

| | | |
|---|---|---|
| JP | 2005-337858 A | 12/2005 |
| JP | 2006-112953 A | 4/2006 |
| JP | 2008-144677 A | 6/2008 |
| JP | 2008-175719 A | 7/2008 |
| JP | 2008-185414 A | 8/2008 |
| JP | 2010-101696 A | 5/2010 |

OTHER PUBLICATIONS

Communication dated Mar. 23, 2015 from the Japanese Patent Office in counterpart application No. 2014-512970.

* cited by examiner

NON-RESONANT KNOCK SENSOR

CROSS REFERENCE TO RELATED APPLICATIONS

This application is a National Stage of International Application No. PCT/JP2013/078822 filed Oct. 24, 2013, claiming priority based on Japanese Patent Application No. 2012-276513 filed Dec. 19, 2012, the contents of all of which are incorporated herein by reference in their entirety.

FIELD OF THE INVENTION

The present invention relates to a non-resonant knock sensor for detecting the occurrence of knocking vibrations in an internal combustion engine.

BACKGROUND ART

An internal combustion engine of an automotive vehicle etc. has a knock sensor capable of detecting a knocking phenomenon and performs control to prevent the occurrence of a knocking phenomenon based on a detection signal outputted from the knock sensor and, more specifically, ignition retard control to the ignition timing of a spark plug based on the output signal of the knock sensor.

As such a knock sensor, there is known a so-called center-hole type non-resonant knock sensor having in the center thereof a mounting hole for mounting the knock sensor on a cylinder block etc. of the internal combustion engine (see Patent Document 1). This type of knock sensor includes a metal shell, an insulator, a piezoelectric element and a weight. The metal shell has a cylindrical portion and a flange portion formed at one end of the cylindrical portion. The insulator, the piezoelectric element and the weight are each annular in shape and are fitted around an outer circumference of the cylindrical portion in order of mention from the flange portion side. The piezoelectric element is fixed between the flange portion and the weight by screwing the weight to a male thread on the outer circumference of the cylindrical portion. The inner unit (sensor body) of the knock sensor, in which the insulator, the piezoelectric element and the weight are fixed in the metal shell, is covered with a resin. The mounting hole is herein defined by an inner surface of the cylindrical portion.

In the above knock sensor, a plurality of cuts are formed axially in a female thread of the weight as an introduction passage of the resin to establish insulation between an outer circumferential surface of the cylindrical portion and an inner circumferential surface of the piezoelectric element. This eliminates the need to provide a separate resin injection hole or groove and enables a reduction of manufacturing cost.

PRIOR ART DOCUMENTS

Patent Documents

Patent Document 1: Japanese Laid-Open Patent Publication No. 2008-185414 (FIG. 1)

SUMMARY OF THE INVENTION

Problems to be Solved by the Invention

As the weight is made large in thickness to secure its weight, it is common practice to produce the weight by forging and cutting a metal material or by sintering a metal powder. However, the formation of the female thread and the cuts as the resin introduction passage in the weight leads to a significant increase of processing cost. The manufacturing cost of the knock sensor becomes high due to such a processing cost increase.

It is accordingly an object of the present invention to provide a non-resonant knock sensor capable of not only preventing a deterioration of internal insulation but also achieving a reduction of manufacturing cost.

Means for Solving the Problems

As a solution to the above problem, there is provided according to the present invention a non-resonant knock sensor, comprising: a sensor body including: a metal shell having a shell-side cylindrical portion formed into a cylindrical shape and a shell-side flange portion extending radially outwardly from one end of the shell-side cylindrical portion; a piezoelectric element having formed therein a first through hole through which the shell-side cylindrical portion is inserted; a weight having formed therein a second through hole through which the shell-side cylindrical portion is inserted and being arranged such that the piezoelectric element is held between the shell-side flange portion and the weight; and a fixing member having formed therein a third through hole through which the shell-side cylindrical portion is inserted and being fitted to an outer circumferential surface of the shell-side cylindrical portion so as to press the weight toward the shell-side flange portion and thereby fix the weight in position; and a resin molded part formed by covering the sensor body with a resin, wherein there is an annular inner space left between inner circumferential surfaces of the piezoelectric element and the weight and the outer circumferential surface of the shell-side cylindrical portion; wherein the fixing member has formed therein a flow passage for introducing the resin into the inner space between the inner circumferential surfaces of the piezoelectric element and the weight and the outer circumferential surface of the shell-side cylindrical portion; and wherein the flow passage is provided in the form of at least one of being connected to the third through hole and being separated from the third through hole and has a plurality of flow paths formed intermittently in a circumferential direction of the fixing portion.

In this non-resonant knock sensor, the weight is fixed by the fixing member; and the flow paths are formed in the fixing member as the introduction passage of the resin. Accordingly, there is no need to form a female thread and a cut or cuts in the weight as the introduction passage of the resin. It is therefore possible to assuredly prevent a deterioration in the internal insulation of the non-resonant knock sensor while reducing the total manufacturing cost of the non-resonant knock sensor.

Figure 2:
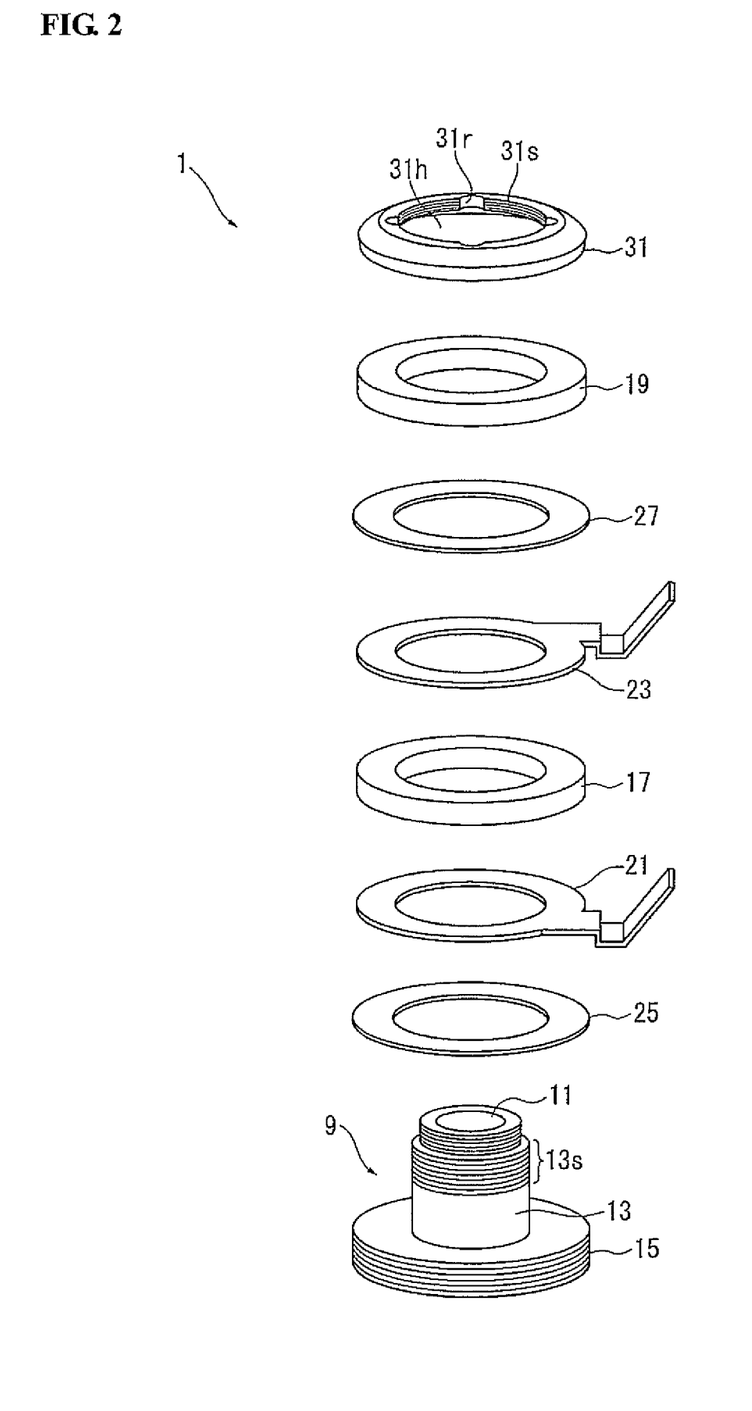
FIG. 2 is an exploded perspective view of the non-resonant knock sensor according to the first embodiment of the present invention.
Figure 4:
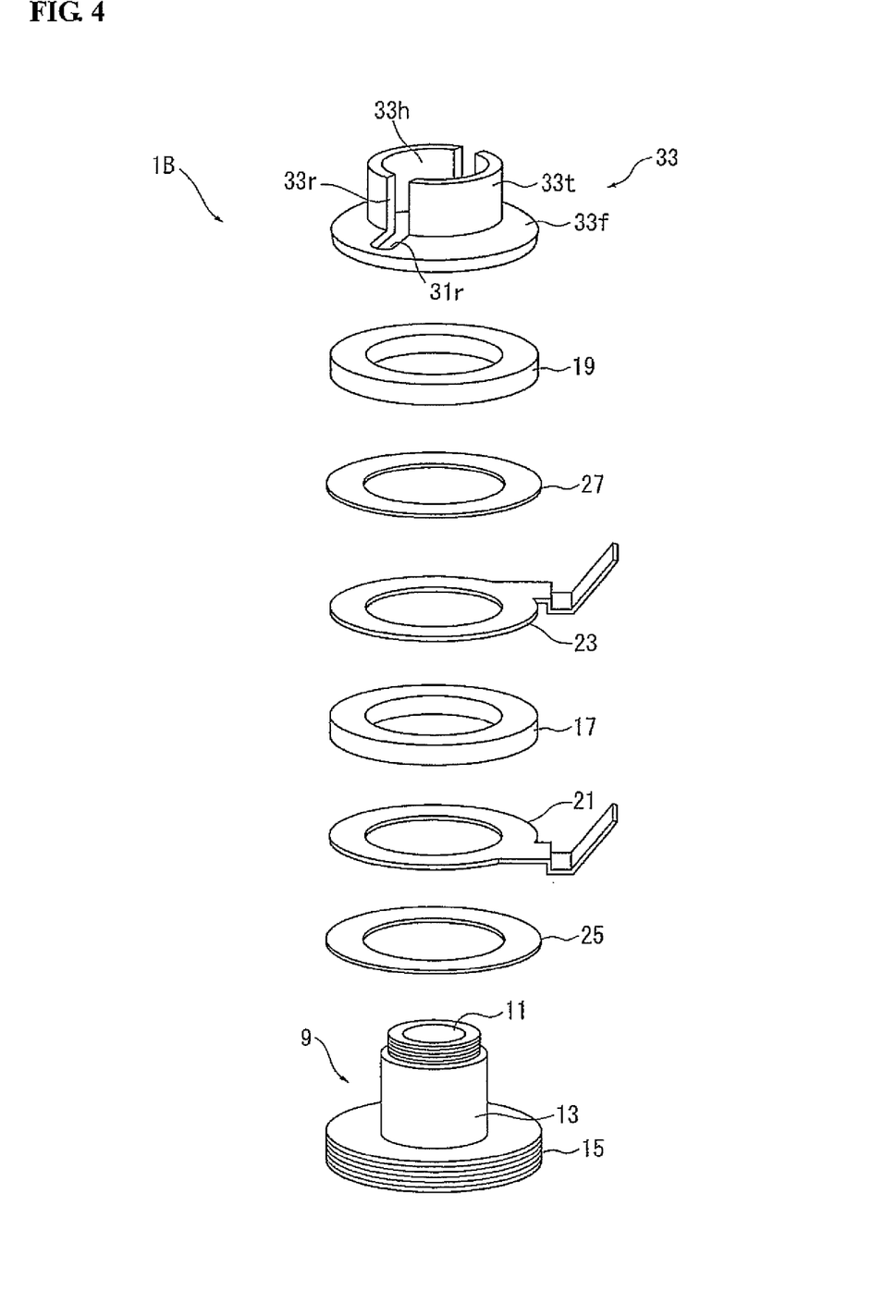
FIG. 4 is an exploded perspective view of a non-resonant knock sensor according to a second embodiment of the present invention.

Herein, the form in which the flow passage is connected to the third through hole includes both of the case where the flow passage extends from an outer surface of the fixing member to the third through hole (e.g., in FIG. 4, extension flow path 33r formed by cutting from an outer surface of a cylindrical portion 33t of the fixing member and connected to the third through hole) and the case where the flow passage extends radially outwardly from a wall surface of the third through hole (e.g. flow path 31r in FIG. 2 or flow path 31r formed in a cylindrical portion 33f of the fixing member in FIG. 4).

The non-resonant knock sensor may be so structured that the fixing member is made of one piece of plate material having the flow paths formed therethrough in a thickness direction of the fixing member.

In this non-resonant knock sensor, it is possible to reduce the component count of the fixing member for further reduction of manufacturing cost.

The non-resonant knock sensor may be so structured that: the fixing member includes a fixing-side cylindrical portion having formed therein the third through hole and being fitted to the outer circumferential surface of the shell-side cylindrical portion and a fixing-side flange portion extending radially outwardly from an end of the fixing-side cylindrical portion closer to the weight and being arranged to press the weight toward the shell-side flange portion and thereby fix the weight in position; and the flow paths include an extension flow path formed in the fixing-side cylindrical portion along the outer circumferential surface of the shell-side cylindrical portion. The extension flow path may be connected to the other flow path.

In this non-resonant knock sensor, the fixing-side cylindrical portion is inserted in the shell-side cylindrical portion so as to serve as a guide and, at the same time, allow a wide area of contact with the shell-side cylindrical portion. It is thus possible to accurately and assuredly fit the fixing member to the outer circumferential surface of the shell-side cylindrical portion. In addition, the resin can be easily introduced in the axial direction of the fixing-side cylindrical portion as the extension flow path is formed along the outer circumferential surface of the shell-side cylindrical portion.

The fixing-side cylindrical portion may be fitted to the outer circumferential surface of the shell-side cylindrical portion at a part other than a part thereof in which the extension flow path is formed.

In this non-resonant knock sensor, the part of the fixing-side cylindrical portion in which the extension flow path is formed is not fitted to the outer circumferential surface of the shell-side cylindrical portion. It is thus possible to assuredly fit the fixing-side cylindrical portion to the outer circumferential surface of the shell-side cylindrical portion without interfering with the flow of the resin.

The non-resonant knock sensor may be so structured that: the shell-side cylindrical portion has a male thread formed on the outer circumferential surface thereof; the fixing member includes a nut element screwed to the male thread of the shell-side cylindrical portion and a washer element disposed between the nut element and the weight and adapted to be elastically deformed in a thickness direction of the washer element so as to press the weight toward the shell-side flange portion; and the flow paths are formed in the washer element at positions radially outside of the nut element.

In this non-resonant knock sensor, it is possible to utilize conventional nut and washer as the nut and washer elements for reduction of component cost. In addition, it becomes easier to introduce the resin into the inner space as the flow paths are formed in the washer element at the positions that do not interfere with the nut element.

Effects of the Invention

It is possible for the knock sensor according to the present invention to prevent a deterioration of internal insulation and achieve a reduction of manufacturing cost.

DESCRIPTION OF THE EMBODIMENTS

First, a non-resonant knock sensor according to a first embodiment of the present invention will be described below with reference to FIGS. 1 to 3.

Figure 1:
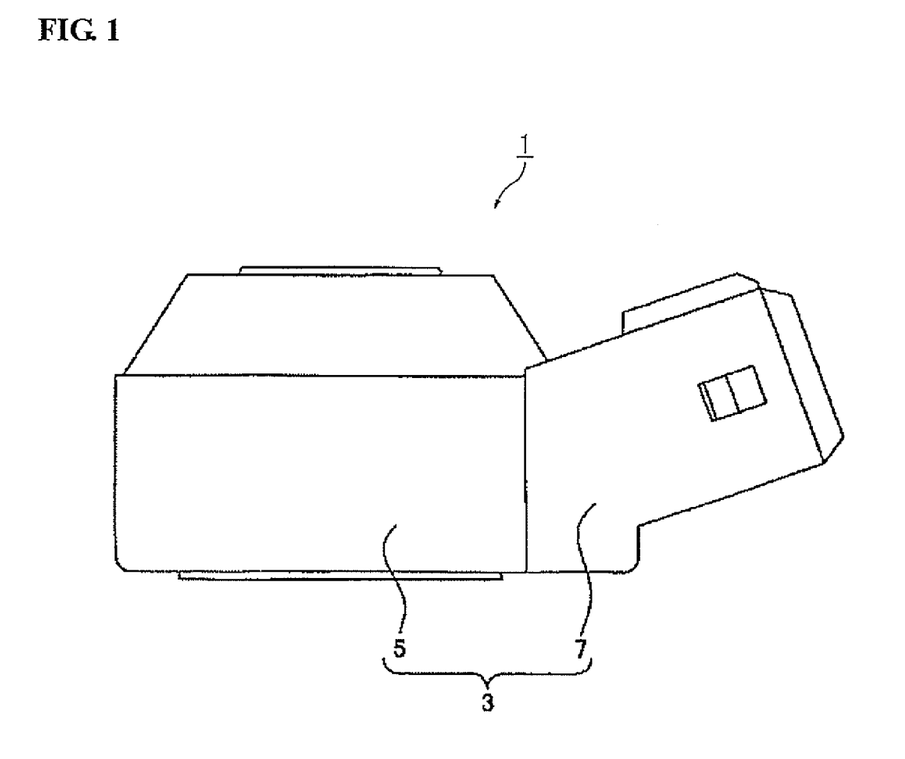
FIG. 1 is an elevation view showing the outer appearance of a non-resonant knock sensor according to a first embodiment of the present invention.

FIG. 1 is an elevation view showing the outer appearance of the knock sensor according to the first embodiment. FIG. 2 is an exploded perspective view of the knock sensor according to the first embodiment. FIG. 3 is an axial section view of the knock sensor according to the first embodiment.

Figure 3:
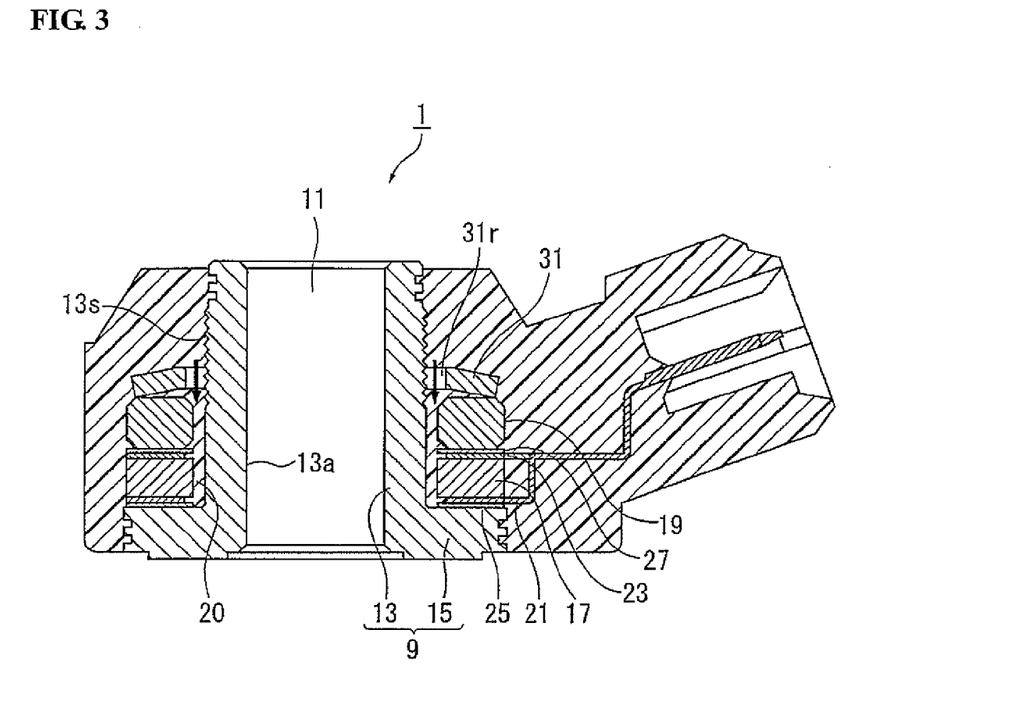
FIG. 3 is a section view of the non-resonant knock sensor according to the first embodiment of the present invention.

As shown in FIG. 1, the non-resonant knock sensor 1 is a so-called center-hole type non-resonant knock sensor having in the center thereof a mounting hole 11 for mounting the knock sensor on a cylinder block etc. of an internal combustion engine (see also FIGS. 2 and 3). The non-resonant knock sensor 1 has it body covered by a resin molded part 3. The resin molded part 3 is made of a resin mold material such as synthetic resin (e.g. nylon 66) and includes an element accommodating portion 5 formed into a circular cylindrical shape with a tapered upper side and a connector portion 7 adapted to engage with a connector of an ignition timing control device (not shown).

As shown in FIGS. 2 and 3, a metal shell 9 is provided in the non-resonant knock sensor 1. The metal shell 9 is made of a metal material (e.g. SPHD, SWCH25K) and includes a shell-side cylindrical portion 13 formed into a circular cylindrical shape through which the mounting hole 11 is defined and a shell-side flange portion 15 extending radially outwardly from one end (lower side in FIG. 1) of the shell-side cylindrical portion 13. A male thread 13s is formed on an outer circumferential surface of the shell-side cylindrical portion 13.

A piezoelectric element 17 is disposed on one side (upper side in FIG. 1) of the shell-side flange portion 15 of the metal shell 9 in a thickness direction (plane direction) of the shell-side flange portion 15. The piezoelectric element 17 is made of a piezoelectric ceramic material (e.g. PZT). The piezoelectric element 18 is formed into an annular shape (circular cylindrical shape) with a through hole (first through hole) and fitted around the outer circumference of the shell-side cylindrical portion 13.

A weight 19 is disposed on an upper side of the piezoelectric element 17. The weight 19 is made of a metal material (e.g. SMF4050) having a specific gravity capable of preforming a weight function. The weight 19 is formed into an annular shape (circular cylindrical shape) with a through hole (second through hole) and fitted around the outer circumference of the shell-side cylindrical portion 13. No female thread is formed in an inner surface of the through hole of the weight 19.

Output terminals 21 and 23 are disposed between the shell-side flange portion 15 and the piezoelectric element 17 and between the weight 19 and the piezoelectric element 17, respectively, i.e. on both sides of the piezoelectric element 17 in a thickness direction of the piezoelectric element 17. These output terminals 21 and 23 are made of a conductive material (e.g. brass) and held in contact with the piezoelectric element 17. More specifically, each of the output terminals 21 and 23 has an annular portion held in contact with the piezoelectric element 17 and a lead portion extending radially outwardly from one end of the annular portion.

Annular insulators 25 and 27 are disposed between the shell-side flange portion 15 and the output terminal 21 and between the output terminal 23 and the weight 19, respectively. These insulators 25 and 27 are made of a film-like insulating synthetic resin material (e.g. PET) and adapted to prevent the output terminals 21 and 23 from being short-circuited with the flange portion 15 of the metal shell 9 and the weight 19.

There is an annular inner space 20 (see FIG. 3) left between inner circumferential surfaces of the piezoelectric element 17, the weight 19, the output terminals 21 and 23 (annular portions) and the insulators 25 and 27 and the outer circumferential surface of the shell-side cylindrical portion 13. This annular inner space 20 is filled with the above-mentioned resin mold material.

A fixing member 31 is disposed on an upper side of the weight 19. The fixing member 31 is formed into an annular shape (circular plate shape) with a through hole 31$h$ (third through hole) and fitted around the outer circumference of the shell-side cylindrical portion 13 so as to press the weight 19 toward the shell-side flange portion 15 (lower side in the drawing) and thereby fix the weight 19 in position. The fixing member 31 is made of a metal material (e.g. SK-5M) having spring characteristics. A male thread 31$s$ is formed in an inner surface of the through hole of the fixing member 31. Semicircular flow paths 31$r$ are formed intermittently at four radial positions around the through hole 31$h$ so as to extend radially outwardly from the female thread 31$s$ and pass through the fixing member 31 in a thickness direction of the fixing member 31. In the first embodiment, these flow paths 31$r$ constitute a flow passage for introducing the resin mold material into the inner space 20 (see arrows in FIG. 3).

Herein, the assembly of the metal shell 9, the piezoelectric element 17, the weight 19, the fixing member 31 and, optionally, the insulators 25 and 27 is referred to as the "sensor body"; and the axial direction is referred to as the plane direction".

In the first embodiment, the outer circumferential side of the fixing member 31 hangs down toward the weight 19 (lower side in the drawing) such that the fixing member 31 has an inverted V-like shape when viewed in cross section in the axial direction. In this configuration, the outer circumferential side of the fixing member 31 is brought into contact with the upper surface of the weight 19 at a lower side of the female thread 31$s$ while the female thread 31$s$ of the fixing portion 31 is screwed to the male thread 13$s$ on the outer circumferential surface of the shell-side cylindrical portion 13. Thus, the weight 19 is elastically pressed by the fixing member 31 under the elasticity of the fixing member 31. Even in the case where the sensor body contracts in the plane direction due to creep deformation of the insulators 25 and 27 with the lapse of time, the fixing member 31 elastically expands in the plane direction so as to prevent a clearance from being formed between the weight 19 and the fixing member 31 and assuredly fix the weight 19 by the fixing member 31.

In the case where any material resistant to creep deformation is selected as the material of the insulators 25 and 27, the fixing member 31 may be formed into a flat plate shape rather than an inverted V-like sectional shape. The material of the insulators 25 and 27 can be selected as appropriate depending on the total cost and operation environment of the non-resonant knock sensor. For example, the insulator 25, 27 is resistant to creep deformation but high in cost when polyphenylenesulfide (PPS), polyethersulfone (PES), polyether ether ketone (PEEK) or other resin is selected as the material of the insulator 25, 27. On the other hand, the insulator 25, 27 is low in cost but prone to creep deformation when PET is selected as the material of the insulator 25, 27.

In the first embodiment, the weight 19 is fixed by the fixing member 31; and the flow paths 31$r$ are formed in the fixing member 31 as the introduction passage of the resin mold material as explained above. Accordingly, there is no need to form a female thread and a cut or cuts as the introduction passage of the resin mold material in the weight 19. It is thus possible to assuredly prevent a deterioration in the internal insulation of the non-resonant knock sensor while reducing the total manufacturing cost of the non-resonant knock sensor.

When the fixing member 31 is made elastic in the plane direction, the weight 19 can be fixed assuredly by the fixing member 31 regardless of the occurrence of creep deformation of the insulators 25 and 27 with the lapse of time. It is thus possible to select the low-cost material for the insulators 25 and 27 and further reduce the total manufacturing cost of the non-resonant knock sensor.

The number, shape and positions of the flow paths 31$r$ are not limited to the above. It suffices to form at least one flow path 31$r$ in the fixing member 31.

Figure 5:
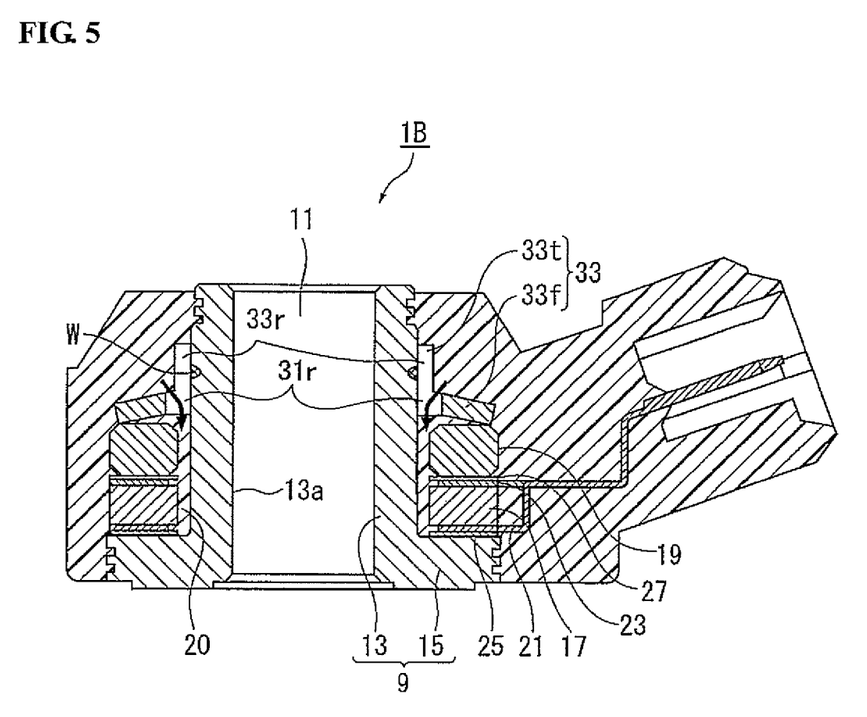
FIG. 5 is a section view of the non-resonant knock sensor according to the second embodiment of the present invention.

Next, a non-resonant knock sensor according to a second embodiment of the present invention will be described below with reference to FIGS. 4 and 5. The non-resonant knock sensor 1B of the second embodiment is similar to the non-resonant knock sensor 1 of the first embodiment, except for the configuration of a fixing member 33. In the second embodiment, like parts and portions to those of the first embodiment are designated by like reference numerals to omit detailed explanations thereof.

As shown in FIG. 4, the fixing member 33 is disposed on an upper side of the weight 19. The fixing member 33 has a fixing-side cylindrical portion 33$t$ formed into a cylindrical shape and a fixing-side flange portion 33$f$ extending radially outwardly from a end of the fixing-side cylindrical portion 33$t$ closer to the weight 19. A through hole 33$h$ is formed through the inside of the fixing-side cylindrical portion 33$t$ so that fixing-side cylindrical portion 33$t$ is fitted around the outer circumference of the shell-side cylindrical portion 13. The fixing-side flange portion 33$f$ is substantially plate-shaped and arranged to press the weight 19 toward the shell-side flange portion 15 (lower side in the drawing) and thereby fix the weight 19 in position.

The fixing member 33 is made of a metal material (e.g. SK-5M) having spring characteristics. Cuts (as extension flow paths 33$r$) are formed axially at two radially opposed positions in the fixing-side cylindrical portion 33$t$, whereas flow paths 31$r$ are formed in the fixing-side flange portion 33$f$ so as to extend radially outwardly from an outer circumferential edge of the fixing-side cylindrical portion 33$t$ to given positions inside the fixing-side flange portion 33$f$. The flow paths 31$r$ are connected to the respective cuts and pass through the fixing member 33 in a thickness direction of the fixing member 33. In the second embodiment, the flow paths 31$r$ as well as the extension flow paths 33$r$ constitute a flow passage for introducing the resin mold material into the inner space 20 (see arrows in FIG. 5).

As explained above, the weight 19 is fixed by the fixing member 33; and the extension flow paths 33*r* are formed in the fixing member 33 as the introduction passage of the resin mold material in the second embodiment. Accordingly, there is no need to form a female thread and a cut or cuts as the introduction passage of the resin mold material in the weight 19. It is thus possible to assuredly prevent a deterioration in the internal insulation of the non-resonant knock sensor while reducing the total manufacturing cost of the non-resonant knock sensor.

Further, the fixing-side cylindrical portion 33*t* is inserted in the shell-side cylindrical portion 13 so as to serve as a guide and, at the same time, allow a wide area of contact with the shell-side cylindrical portion 13 in the second embodiment. It is thus possible to accurately and assuredly fit the fixing member 33 to the outer circumferential surface of the shell-side cylindrical portion 13.

In the second embodiment, the male thread 13*s* is not formed on the outer circumferential surface of the shell-side cylindrical portion 13; and the female thread is not formed in the inner surface of the through hole 33*h*. However, the fixing-side cylindrical portion 33*t* is fitted to the outer circumferential surface of the shell-side cylindrical portion 13 by inserting the fixing-side cylindrical portion 33*t* into the shell-side cylindrical portion 13 and, while pressing the weight 19 downward by the fixing-side flange portion 33*f*, joining any parts other than the parts of the fixing-side cylindrical portion 33*t* in which the extension flow paths 33*r* are formed, by welding (e.g. laser welding) at weld joints W from the outside or by crimping radially inwardly crimping. There is accordingly no need to form the male thread on the outer circumferential surface of the shell-side cylindrical portion 13. It is thus possible to further reduce the total manufacturing cost of the non-resonant knock sensor.

Even in the second embodiment, the outer circumferential side of the fixing-side flange portion 33*f* may hang down toward the weight 19 (lower side in the drawing) such that the fixing-side flange portion 33*f* has an inverted V-like shape when viewed in cross section in the axial direction. In this case, the weight 19 can be fixed assuredly by the fixing member 33 regardless of the occurrence of creep deformation of the insulators 25 and 27 as explained above.

The number, shape and positions of the extension flow paths 33*r* are not limited to the above. It suffices to form at least one extension flow path 33*r* in the fixing member 33. Although the flow paths may be formed only in the fixing-side flange portion 33*t*, it becomes easier to introduce the resin mold material into the inner space 20 by not only forming the flow paths in the fixing-side flange portion 33*t* but also forming the extension flow paths 33*r* in the fixing-side cylindrical portion 33*t* that is located close to the inner space 20.

A non-resonant knock sensor according to a third embodiment of the present invention will be described below with reference to FIGS. 6 and 7. The non-resonant knock sensor 1C of the third embodiment is similar to the non-resonant knock sensor 1 of the first embodiment, except for the configuration of a fixing member 35. In the third embodiment, like parts and portions to those of the first embodiment are designated by like reference numerals to omit detailed explanations thereof.

Figure 6:
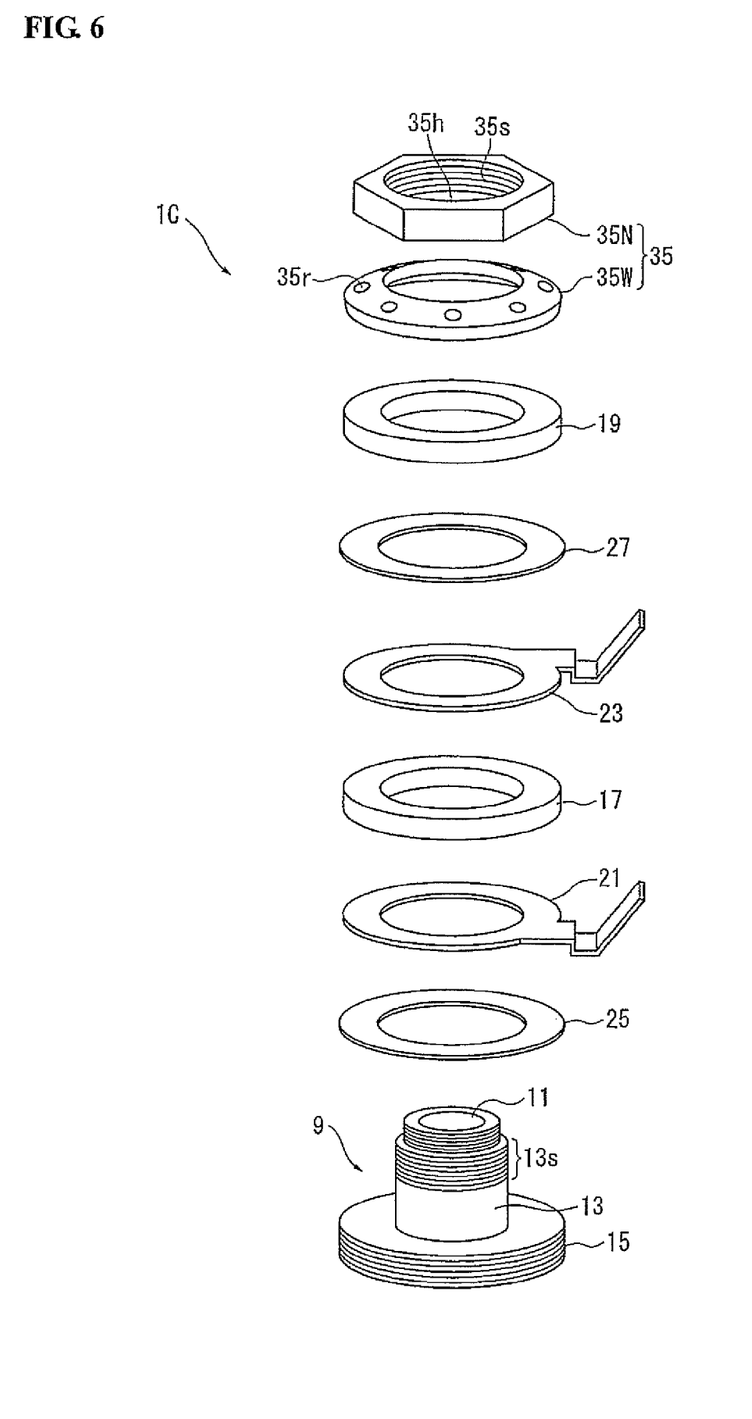
FIG. 6 is an exploded perspective view of a non-resonant knock sensor according to a third embodiment of the present invention.
Figure 7:
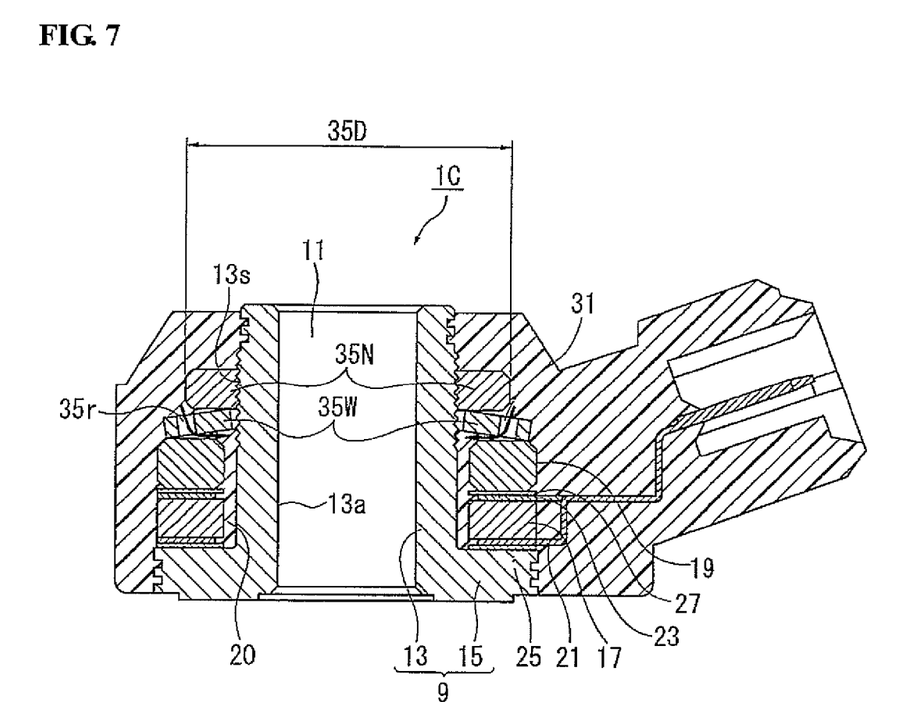
FIG. 7 is a section view of the non-resonant knock sensor according to the third embodiment of the present invention.

As shown in FIG. 6, the fixing member 35 is disposed on an upper side of the weight 19. The fixing member has a hexagonal nut (as a nut element) 35N screwed to the male thread 13*s* of the shell-side cylindrical portion 13 and a washer (as a washer element) 35W disposed between the nut element 35N and the weight 19. A through hole 35*h* is formed through the inside of the nut element 35N so that the nut element 35N is fitted around the outer circumference of the shell-side cylindrical portion 13. A female thread 35*s* is formed in an inner surface of the through hole 35*h*. The washer element 35W is arranged to press the weight 19 toward the shell-side flange portion 15 (lower side in the drawing) and thereby fix the weight 19 in position.

The washer element 35W is made of a metal material (e.g. SK-5M) having spring characteristics and adapted to be elastically deformed in a thickness direction of the washer element 35W.

A plurality of circular-hole-shaped flow paths 35*r* are formed in the washer element 35W at circumferential positions radially outside of the nut element 35N so as to pass through the washer element 35 in a thickness direction of the washer element 35. In the third embodiment, these flow paths 35 constitute a flow passage for introducing the resin mold material into the inner space 20 (see arrows in FIG. 7). It means that, when the flow paths 35*r* are formed at the positions radially outside of the nut element 35N, at least parts of the flow paths 35 are arranged radially outside of the maximum diameter 35D of the nut element 35N (i.e., the circumcircle of the nut element 35N) as shown in FIG. 7. By this arrangement, it becomes easier to introduce the resin mold material from the outside without being interfered with by the nut element 35N.

As explained above, the weight 19 is fixed by the fixing member 35; and the flow paths 35*r* are formed in the fixing member 35 as the introduction passage of the resin mold material in the third embodiment. There is accordingly no need to form a female thread and a cut or cuts as the introduction passage of the resin mold material. It is thus possible to prevent a deterioration in the internal insulation of the non-resonant knock sensor while reducing the total manufacturing cost of the non-resonant knock sensor. It is also possible to utilize conventional general-purpose nut and washer as the nut and washer elements 35N and 35W for reduction of component cost. In addition, it becomes easier to introduce the resin mold material into the inner space 20 as the flow paths 35*r* are formed in the washer element 35W at the positions that do not interfere with the nut element 35N.

In the third embodiment, the outer circumferential side of the washer element 35W hangs down toward the weight 19 such that the washer element 35W has an inverted V-like shape when viewed in cross section in the axial direction. The weight 19 can be thus fixed assuredly by the fixing member 35 regardless of the occurrence of creep deformation of the insulators 25 and 27 as explained above.

The number, shape and positions of the flow paths 35*r* are not limited to the above. It suffices to form at least one flow path 35*r* in the fixing member 35.

It should be noted that: the present invention is not limited to the above embodiments; and various modifications and equivalents of the above embodiments fall within the scope of the present invention. For example, the shape of the fixing member is not limited to the above.

DESCRIPTION OF REFERENCE NUMERALS

1, 1B, 1C: Non-resonant knock sensor
3: Resin molded part
9: Metal shell
13: Shell-side cylindrical portion
13*s*: Male thread 15: Shell-side flange portion
17: Piezoelectric element
19: Weight
20: Inner space
31, 33, 35: Fixing member
31*h*, 33*h*, 35*h*: Third through hole
31*r*, 35*r*: Flow path
33*r*: Extension flow path
33*t*: Fixing-side cylindrical portion
33*f*: Fixing-side flange portion
35N: Nut element
35W: Washer element

The invention claimed is:

1. A non-resonant knock sensor, comprising:
a sensor body including:
a metal shell having a shell-side cylindrical portion formed into a cylindrical shape and a shell-side flange portion extending radially outwardly from one end of the shell-side cylindrical portion;
a piezoelectric element having formed therein a first through hole through which the shell-side cylindrical portion is inserted;
a weight having formed therein a second through hole through which the shell-side cylindrical portion is inserted and being arranged such that the piezoelectric element is held between the shell-side flange portion and the weight; and
a fixing member having formed therein a third through hole through which the shell-side cylindrical portion is inserted and being fitted to an outer circumferential surface of the shell-side cylindrical portion so as to press the weight toward the shell-side flange portion and thereby fix the weight in position; and
a resin molded part formed by covering the sensor body with a resin,
wherein there is an annular inner space left between inner circumferential surfaces of the piezoelectric element and the weight and the outer circumferential surface of the shell-side cylindrical portion;
wherein the fixing member includes:
a fixing-side cylindrical portion having formed therein the third through hole and being fitted to the outer circumferential surface of the shell-side cylindrical portion; and
a fixing-side flange portion extending radially outwardly from an end of the fixing-side cylindrical portion closer to the weight and being arranged to press the weight toward the shell-side flange portion and thereby fix the weight in position;
wherein the fixing member has formed therein a flow passage for introducing the resin into the inner space between the inner circumferential surfaces of the piezoelectric element and the weight and the outer circumferential surface of the shell-side cylindrical portion;
wherein the flow passage is provided in the form of at least one of being connected to the third through hole and being separated from the third through hole and has a plurality of flow paths formed intermittently in a circumferential direction of the fixing portion; and
wherein the plurality of flow paths include an extension flow path formed in the fixing-side cylindrical portion along the outer circumferential surface of the shell-side cylindrical portion.

2. The non-resonant knock sensor according to claim 1, wherein the fixing member is made of one piece of plate material having the flow paths formed therethrough in a thickness direction of the fixing member.

3. The non-resonant knock sensor according to claim 1, wherein a part other than a part of the fixing-side cylindrical portion in which the extension flow path is formed is fitted to the outer circumferential surface of the shell-side cylindrical portion.

4. The non-resonant knock sensor according to claim 1, wherein the shell-side cylindrical portion has a male thread formed on the outer circumferential surface thereof;
wherein the fixing member includes:
a nut element screwed to the male thread of the shell-side cylindrical portion; and
a washer element disposed between the nut element and the weight and adapted to be elastically deformed in a thickness direction of the washer element so as to press the weight toward the shell-side flange portion; and
wherein the flow paths are formed in the washer element at positions radially outside of the nut element.

* * * * *